W. G. CHENEY.
METHOD OF MAKING SHOES.
APPLICATION FILED JAN. 27, 1917. RENEWED FEB. 21, 1922.
1,432,533.
Patented Oct. 17, 1922.
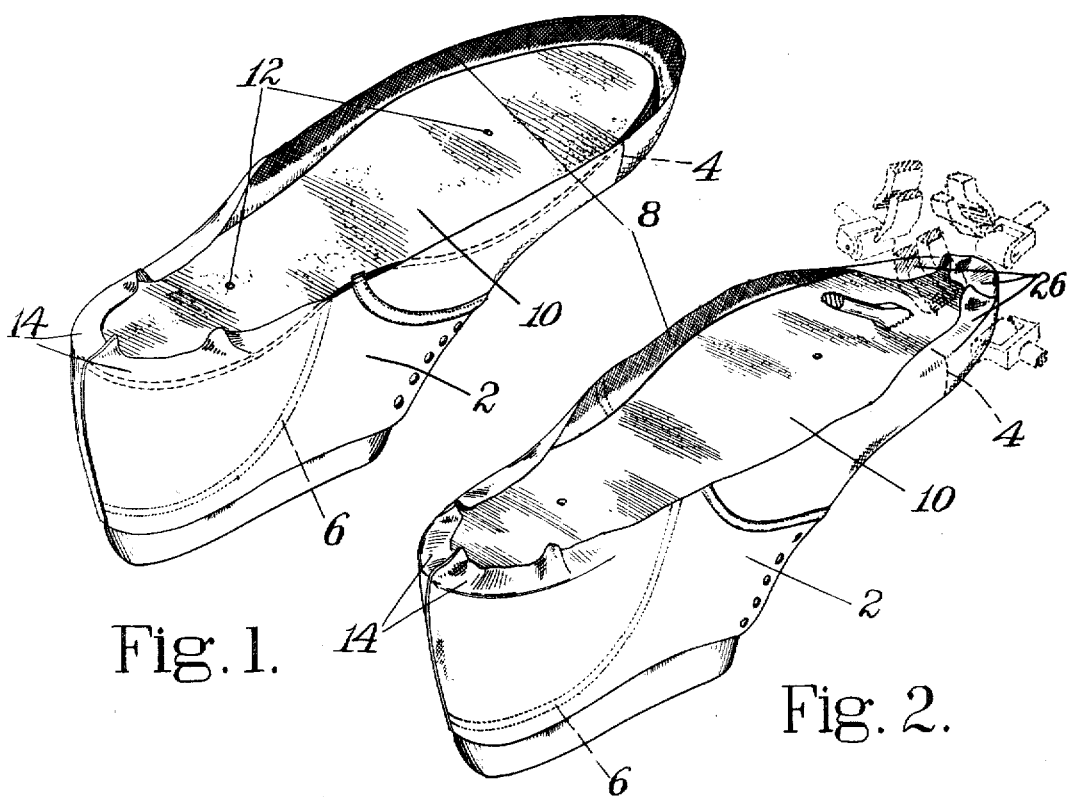
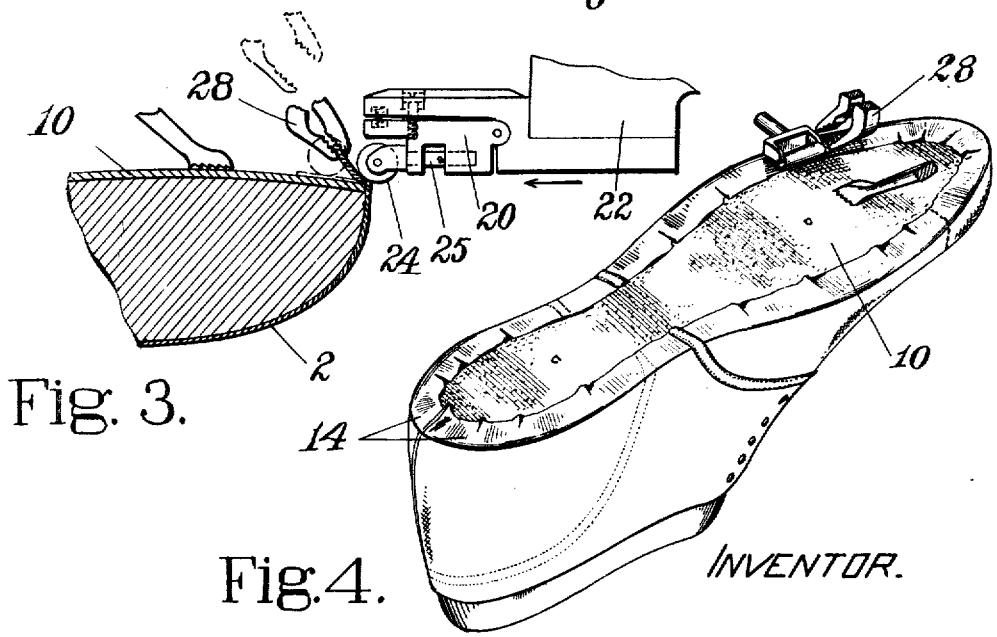
INVENTOR.
William G Cheney Patented Oct. 17, 1922.

1,432,533

UNITED STATES PATENT OFFICE.

WILLIAM G. CHENEY, OF MARLBORO, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

METHOD OF MAKING SHOES.

Application filed January 27, 1917, Serial No. 144,980. Renewed February 21, 1922. Serial No. 538,421.

*To all whom it may concern:*

Be it known that I, WILLIAM G. CHENEY, a citizen of the United States, and resident of Marlboro, in the county of Middlesex and State of Massachusetts, have invented certain Improvements in Methods of Making Shoes, of which the following description, in connection with the accompanying drawings, is a specification, like reference characters on the drawings indicating like parts in the several figures.

This invention relates to the manufacture of shoes and more particularly to the manufacture of shoes in which the upper is secured to the bottom portion of the shoe in the lasting operation by adhesion, as, for example, in vulcanized rubber soled shoes.

In the manufacture of vulcanized rubber soled shoes, in accordance with the usual practice, an innersole is employed which is molded from a rubber compound known generally as "rag stock" and the upper of the shoe has a coating of rubber cement applied to its inside marginal surface to provide a fastening medium for the attachment of the upper to the innersole. Heretofore shoes of this type have been made almost entirely by hand, the operator using his fingers to work the upper over into position on the innersole and to press it into firm adhesion thereto. This method of making shoes is not only exceedingly laborious but fails to lend itself to the production of work of uniform quality, and unless carefully performed it produces a considerable number of so-called "reject" shoes which have to be disposed of by the manufacturer with little, if any, profit. Furthermore, it is practically impossible for an operator thus to apply any substantial degree of tension to the upper with his fingers to shape the upper to the contour of the last. For this reason, among others, this system is not adapted to the production of shoes having a neat and stylish appearance.

The present invention has for its principal object to provide an improved method of making shoes in which the upper is fastened to the insole by adhesion, by the practice of which the lasting operation may be performed with greater facility and accuracy than is possible with any prior method of lasting these shoes, and whereby a shoe may be produced which is far superior both in appearance and serviceability to the vulcanized rubber soled shoes heretofore produced. To this end the invention provides a method of making shoes of the type hereinbefore mentioned in which the upper is pulled to conform it to the last, and it may be also to dispose the marginal portion of the tensioned upper about the last in overdrawn relation to the innersole, and whereby the marginal portion of the upper is caused to adhere to the innersole by the application of rolling pressure. In accordance with the practice of this method in the manner herein illustrated, the general direction of the overdrawing tension is such as to draw the marginal portion of the upper acted upon into temporary position at an angle to the plane of the innersole and the rolling pressure is applied in a direction following the general direction of tension of the upper, whereby the marginal portion of the upper is lasted over upon the innersole without the formation of any objectionable number of pleats or other uneven portions on the shoe bottom. It is also contemplated that, in accordance with one manner of practicing the method, the rolling pressure for effecting adhesion between the margin of the upper and the innersole will be applied at the outer edge portion of the shoe bottom while the upper is still under tension, and preferably with the margin of the upper at an angle to the plane of the innersole, thus guarding against objectionable reaction of the tensioned upper and also against premature adhesion of the margin of the upper to the innersole. Thereafter the marginal portion of the upper will be released from the pull, and the rolling pressure may then be continued inwardly to the edge of the upper to press all portions of the margin smoothly upon the innersole.

In one of its aspects, the invention contemplates operating upon the toe portion of an upper for drafting and pulling-over the upper about the last and then securing the upper in pulled over position to the innersole by the application of rolling pressure directed inwardly from a plurality of points about the toe of the shoe while the upper remains under tension. This invention for the first time in rubber soled shoe manufacture provides a method whereby the shoe upper may be uniformly and accurately positioned and pulled over on the last and the toe portion of the upper securely attached to the innersole.

In another aspect the novel method provides for tensioning successive portions of the upper of a shoe and forcing them into adhesion with the innersole by the application of rolling pressure for completely lasting the shoe.

The invention in its various aspects will now be more particularly described in connection with the accompanying drawings which illustrate the different steps, and will then be pointed out in the claims.

Fig. 1 of the drawings is a perspective view showing a shoe upper and an innersole assembled on a last and in condition for pulling-over and lasting.

Fig. 2 is a perspective view showing the shoe pulled over in accordance with the method of the present invention.

Fig. 3 is a view illustrating certain steps in the practise of the present invention.

Fig. 4 is a perspective view illustrating the manner of lasting the shoe and showing the shoe in its completely lasted condition.

In carrying out the method of the present invention in one manner in which it has been successfully practised, the shoe upper 2 having the usual toe stiffener 4 and counter 6 is first prepared for lasting by applying an adhesive coating such as rubber cement to the inner marginal surface of the upper as indicated at 8 in Fig. 1. The innersole 10 for the shoe consists of a "green" or unvulcanized rubber compound known generally as "rag stock", the upper surface of the innersole presenting a sticky or tacky surface to assist in causing the marginal portion of the upper to adhere to it. The prepared upper 2 and the innersole 10 are now assembled on the last, the innersole being temporarily secured on the last by fastenings 12, located at the heel and forepart of the innersole and the margin 14 of the upper at the heel end is laid over the innersole to cause it to adhere to the innersole in assembled relation thereto, as shown in Fig. 1.

After the shoe has been properly assembled, as described, it is subjected to a pulling-over operation for drafting the upper about the last and laying the toe portion of the upper over on the innersole. A machine which may be used for practising this part of the method of this invention is shown and described in my co-pending application Ser. No. 248,850, filed August 8, 1918 and comprises a plurality of power operated grippers arranged to engage the marginal portion of the upper at the forepart of the shoe and a number of upper rolling devices which are adapted to force the marginal portions of the upper into adhesion with the innersole by the application of rolling pressure. In the use of this machine the grippers 28 are first operated to draft the upper about the last and remove any stretch in the upper materials to cause the shoe upper to retain its shape in the finished shoe, and then the rolling devices are advanced, in timed relation to the operation of the grippers along the plane of the shoe bottom to engage the tensioned upper and force it into adhesion with the innersole as shown in Fig. 2. The illustrated rolling device Fig. 3 comprises a carrier 20 mounted on a reciprocable member 22 and an upper engaging roller 24 which is mounted for rotation on the forward end of a forked member 25 secured to the carrier. Preferably these rollers 24 are arranged to engage the toe portion of the upper at several points about the toe of the shoe, as indicated at 26, Fig. 2, and to follow the general direction of tension applied to the upper by the grippers as they are operated to wrap the toe portion of the upper about the last so that the upper is gathered uniformly about the toe of the last. As illustrated in Fig. 3 the rollers advance over the edge of the shoe bottom before the grippers release the tensioned upper so as to prevent any reaction of the upper before it becomes attached to the innersole. The margin of the upper is thus held by the grippers in inclined relation to the plane of the innersole as it is rolled upon the bottom face of the outer edge of the innersole, to prevent premature adhesion of the margin to the innersole and consequent danger of wrinkling the margin. After a sufficient area of the margin of the upper has adhered to the innersole to insure against relaxing the tension, the grippers release the upper and the inward movement of the rollers is continued to lay the margin smoothly upon the innersole as illustrated by dotted lines in Fig. 3. By the application of rolling pressure to press the marginal portion of the upper into adhesion with the innersole the upper is forced on to the sticky surface of the innersole progressively from the edge of the shoe inwardly thereby retaining the maximum tension on the upper until it is firmly attached to the innersole. Furthermore, by utilizing a rolling pressure to last the upper there is a minimum of tendency to displace the marginal portion of the soft innersole as the rollers engage the upper, thereby making it possible to increase the speed of the machine while at the same time insuring a good quality of work.

The remaining unlasted portions of the shoe are now lasted. This may be done by hand but will preferably be done by means of a machine in which successive portions of the upper are tensioned and lasted over upon the innersole, the machine including a power operated gripper 28 arranged to reach down and seize the marginal portion of the upper and then to rise and apply tension to the upper in a direction to draw the marginal portions of the upper toward lasted position over the innersole. The successively tensioned portions of the upper along the sides of the shoe are laid over upon the innersole by an upper rolling device which will be similar to that which which has been described above and is shown in Fig. 3. In this machine a single upper rolling device will be used and its operation will be substantially the same as its operation on the machine for pulling-over the shoe as above described, the grippers first tensioning the upper and then the rolling device advancing and rolling down the marginal portion of the upper upon the innersole in which position it becomes securely attached to the innersole by the cement. The rolling pressure applied by the roller effects a much stronger adhesion of the upper to the innersole than pressure applied by the operator with his fingers and, also, insures a more complete contact and adhesion of the overlaid portion of the upper to the innersole than has been possible in the prior hand rubbing operation. Preferably also the release of the upper 2 by the gripper 28 occurs at such time relatively to the advance of the upper rolling device 24 that the latter engages the upper and lays the marginal portion upon the innersole before the upper has had an opportunity to react or the marginal portion to fall upon the innersole in an improper position. In practice it will be found advantageous at times to present the shoe to the machine in such manner as to prevent the gripper from seizing certain portions of the upper to tension it before the upper rolling device is advanced to force down the margin of the upper on the innersole. Also, several applications of rolling pressure only may be applied to certain portions of the shoe upper, for example, at the toe and the heel where numerous pleats have been formed in the upper, for the purpose of compacting the upper materials and leveling the shoe bottom for the reception of an outer sole.

It will be seen that by the practice of this invention the shoe upper is conformed to the last more accurately and uniformly than with the hand method of lasting heretofore practiced and at the same time the labor incident to hand lasting is greatly reduced. Moreover, the method of lasting vulcanized rubber soled shoes herein disclosed aids appreciably in performing subsequent operations on the shoe and obtaining proper vulcanization of the shoe, thus reducing the number of "reject" shoes to a minimum.

Having explained the nature of my invention and set forth fully how it may be practised, what I claim as new and desire to secure by Letters Patent of the United States is:—

1. That improvement in the art of making shoes which consists in applying an adhesive in position to effect adhesion between the inner marginal surface of a shoe outer and the upper marginal surface of an innersole, assembling the upper and the innersole upon a last, pulling the marginal portion of the upper in a direction to draw the marginal portion into temporary position at an angle to the plane of the innersole, and then causing the marginal portion of the tensioned upper to adhere to the innersole by the application of rolling pressure while the upper is under tension.

2. That improvement in the art of making shoes which consists in applying an adhesive in position to effect adhesion between the inner marginal surface of a shoe outer and the upper marginal surface of an innersole, assembling the upper and the innersole upon a last, subjecting the marginal portion of the shoe upper to a pulling force in a direction to stretch the upper to the shape of the last, and then causing the margin of the upper acted upon by the pulling force to adhere to the innersole by the application of a rolling pressure before substantial reaction of the upper has taken place.

3. That improvement in the art of making shoes which consists in applying an adhesive in position to effect adhesion between the inner marginal surface of a shoe outer and the upper marginal surface of an innersole, assembling the upper and the innersole upon a last, pulling the marginal portion of the upper at a plurality of points substantially simultaneously in directions to pull the upper over the last and to draw the marginal portion of the tensioned upper into temporary position relatively to the innersole, causing the marginal portion of the tensioned upper to adhere to the innersole at a plurality of points by the application of rolling pressure, and then pulling successive marginal portions of the remaining unlasted upper and rolling the successively tensioned marginal portions of the upper into adhesion with the innersole.

4. That improvement in the art of making shoes which consists in applying an adhesive in position to effect adhesion between the inner marginal surface of a shoe upper and the outer marginal surface of an innersole, assembling the upper and the innersole upon a last, pulling successively in different locations along the marginal portion of the upper in directions to draw the marginal portion into temporary position relatively to the innersole, and rolling each of the successively tensional marginal portions of the upper into adhesion with the innersole.

5. That improvement in the art of making shoes which consists in applying an adhesive in position to effect adhesion between the inner marginal surface of a shoe outer and the upper marginal surface of an innersole, assembling the upper and the innersole upon a last, subjecting successive portions of the margin of the upper to a pulling force to draw the marginal portion of the upper toward lasted position at an angle to the plane of the innersole, and laying the marginal portions of the tensioned upper in adhesion with the innersole by the application of rolling pressure directed from the outer edge of the shoe bottom inwardly across the margin of the upper before substantial reaction of the upper has taken place.

6. That improvement in the art of making shoes which consists in applying cement to the margin of a shoe upper to effect adhesion between the marginal portion of the outer and the upper marginal surface of an innersole, assembling the upper and the innersole upon a last, applying tension to the upper at a plurality of points about the toe end portion of the shoe in directions to draw the marginal portion of the upper toward pulled over position relatively to the innersole, and then laying the margin of the tensioned portions of the upper in adhesion with the innersole before the upper is released from tension by the application of rolling pressure directed inwardly from a plurality of points about the toe portion of the shoe.

7. That improvement in the art of lasting shoes which consists in applying cement to a shoe upper in position to effect adhesion between the marginal portion of the outer and the upper marginal surface of an innersole, assembling the upper and the innersole upon a last, applying tension to successive portions of the upper in directions to conform the upper to the contour of the last, and applying an independent rolling pressure to each of the successively tensioned marginal portions of the upper to cause it to become attached to the innersole before the tension of the upper is relaxed.

8. That improvement in the art of making shoes which comprises assembling an upper and an innersole upon a last, applying cement to the margin of one of said shoe parts, pulling the margin of the upper inwardly over the innersole and subjecting said margin to rolling pressure directed inwardly from the edge of the shoe bottom and against the innersole to effect adhesion between the margin of the upper and the innersole before the tension of the upper is relaxed.

9. That improvement in the art of making shoes which consists in gripping the margin of an upper on a last and pulling the upper into conformity to the contour of the last, applying rolling pressure to the margin of the upper inwardly from the edge of the shoe bottom to press the margin upon an innersole on the last while continuing the pull on the margin in such direction as to hold the inner edge portion of said margin out of contact with the innersole, and thereafter releasing the grip on the margin of the upper and continuing the rolling pressure farther inwardly from the edge of the shoe bottom.

10. That improvement in the art of making shoes which consists in pulling an upper over a last and drawing its margin inwardly over an innersole on the bottom of the last in inclined relation to the plane of the innersole, applying rolling pressure to the margin of the upper inwardly from the edge of the shoe bottom to press the upper upon the innersole while continuing to pull the margin in a direction inclined to the plane of the innersole, and thereafter releasing the pull on the margin of the upper and continuing the rolling pressure farther inwardly from the edge of the shoe bottom.

11. That improvement in the art of making shoes which consists in pulling an upper to conform it to the contour of a last, and thereafter applying rolling pressure progressively to the marginal portion of the upper inwardly from the edge of the shoe bottom to lay the margin of the upper over an innersole on the bottom of the last.

In testimony whereof I have signed my name to this specification.

WILLIAM G. CHENEY

Certificate of Correction.

It is hereby certified that in Letters Patent No. 1,432,533, granted October 17, 1922, upon the application of William G. Cheney, of Marlboro, Massachusetts, for an improvement in "Methods of Making Shoes," errors appear in the printed specification requiring correction as follows: Page 3, line 11, strike out the word "which"; same page, lines 72 and 73, 86 and 87, 100 and 101, claims 1, 2, and 3, and page 4, lines 3 and 4, 22, 39. and 40, claims 5, 6, and 7, for the words "outer and the upper" read *upper and the outer;* page 3, line 128, claim 4, for the word "tensional" read *tensioned;* and that the said Letters Patent should be read with these corrections therein that the same may conform to the record of the case in the Patent Office.

Signed and sealed this 28th day of November, A. D., 1922.

[SEAL.]                      KARL FENNING,

*Acting Commissioner of Patents.*